(12) United States Patent
Tanty

(10) Patent No.: US 9,187,172 B2
(45) Date of Patent: Nov. 17, 2015

(54) BRAKE FOR AN AIRCRAFT WHEEL

(71) Applicant: MESSIER-BUGATTI-DOWTY, Velizy Villacoublay (FR)

(72) Inventor: Fabien Tanty, Chartainvilliers (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 3 days.

(21) Appl. No.: 13/889,857

(22) Filed: May 8, 2013

(65) Prior Publication Data
US 2013/0299286 A1 Nov. 14, 2013

(30) Foreign Application Priority Data

May 10, 2012 (FR) ...................................... 12 54293

(51) Int. Cl.
*F16D 55/36* (2006.01)
*B64C 25/42* (2006.01)
*B64C 25/44* (2006.01)
*F16D 65/18* (2006.01)
*F16D 55/40* (2006.01)
*F16D 121/24* (2012.01)
*F16D 55/24* (2006.01)
*F16D 121/04* (2012.01)

(52) U.S. Cl.
CPC ................ B64C 25/42 (2013.01); B64C 25/44 (2013.01); F16D 55/40 (2013.01); F16D 65/186 (2013.01); F16D 55/24 (2013.01); F16D 2121/04 (2013.01); F16D 2121/24 (2013.01)

(58) Field of Classification Search
CPC ...... B64C 25/42; B64C 25/426; B64C 25/44; B64C 25/445; B64C 25/46; F16D 2121/24; F16D 2055/002; F16D 55/24; F16D 55/36; F16D 55/38; F16D 55/44
USPC ........ 188/18 A, 71.5, 72.4, 73.1, 73.2, 73.32, 188/73.39, 73.46, 156; 244/111
See application file for complete search history.

(56) References Cited

U.S. PATENT DOCUMENTS

| 4,175,651 | A | * | 11/1979 | Montalvo, Sr. ............. 192/85.09 |
| 4,442,931 | A | * | 4/1984 | Montalvo, Sr. ............. 192/85.09 |
| 2005/0115778 | A1 | * | 6/2005 | Chico et al. .................. 188/72.1 |
| 2006/0042889 | A1 | * | 3/2006 | Linden et al. ................ 188/71.5 |
| 2009/0120739 | A1 | * | 5/2009 | Corio .......................... 188/73.32 |
| 2010/0170755 | A1 | * | 7/2010 | Biggs ........................... 188/72.4 |

FOREIGN PATENT DOCUMENTS

EP 1 084 949 A2 3/2001
EP 1 533 536 A1 5/2005

* cited by examiner

*Primary Examiner* — Nicholas J Lane
(74) *Attorney, Agent, or Firm* — Sughrue Mion, PLLC

(57) ABSTRACT

A brake for an aircraft wheel comprising an actuator-carrier 14 that carries at least one electromechanical actuator 15 having a pusher 19 that is movable along a direction parallel to an axis of rotation X of the wheel 2 and facing friction elements 7, 10 in order to apply a braking force selectively against the friction elements 7, 10. The actuator-carrier 14 and the actuator 15 include guide means 25, 32 for guiding the actuator 15 while being installed on the actuator-carrier 14 in a radial direction Y until it reaches a service position. The guide means forms a bearing surface for transmitting braking forces from the actuator to the actuator-carrier. Position-holder means 37 holds the position of the actuator in its service position and comprises a strap 37 fastened to the actuator-carrier 14 to prevent the actuator 15 from moving on the actuator-carrier 14 in the service position.

9 Claims, 4 Drawing Sheets

BRAKE FOR AN AIRCRAFT WHEEL

The invention relates to an electric brake for an aircraft wheel, the brake having an actuator-carrier that carries at least one electromechanical actuator.

BACKGROUND OF THE INVENTION

The braking systems of most modern aircraft comprise brakes with steel or carbon disks that are stacked around a torsion tube, and brake actuators that are carried by a support and that are controlled to apply a braking force on the disks in order to exert a braking torque on the braked wheels of the aircraft, thereby tending to slow the aircraft down. In general, the braked wheels are the wheels of the main undercarriages of aircraft.

The actuators of electromechanical brakes are electrically powered, and each of them comprises an electric motor adapted to move a pusher.

The installation of such actuators on the support, referred to as an "actuator-carrier" in electromechanical brakes, ought preferably to enable an actuator to be removed without removing the wheel and the brake, since those operations are relatively lengthy and complex. It is naturally also preferable to facilitate access for an operator on the ground to the means that fasten actuators on the actuator-carrier, and to make them easier to manipulate.

The installation of such actuators must also satisfy mechanical strength requirements. The connections between the actuators and the actuator-carrier are subjected to high levels of mechanical stress that occur mainly when landing and during the stage of braking that follows such landing. In general, the actuators are screwed directly to the actuator-carrier. The high levels of impacts and of vibration that can occur during landing and braking, and also the force exerted by the pushers during braking can give rise to high levels of transverse force on the fastener screws.

OBJECT OF THE INVENTION

The object of the invention is to provide an electric brake for an aircraft wheel that makes it easy to install and remove braking actuators, and that improves the robustness with which actuators are installed on the actuator-carrier.

SUMMARY OF THE INVENTION

In order to achieve this object, the invention provides a brake for an aircraft wheel, the brake comprising an actuator-carrier that carries at least one electromechanical actuator having a pusher that is axially displaceable along an axis parallel to an axis of rotation of the wheel and facing friction elements in order to apply a braking force selectively against the friction elements, the actuator-carrier and the actuator including guide means for guiding the actuator while it is being installed on the actuator-carrier in a radial direction until it reaches a service position, said guide means forming a bearing surface suitable for transmitting braking forces from the actuator to the actuator-carrier, and position-holder means for holding the position of the actuator in its service position that comprise a strap fastened to the actuator-carrier in order to prevent the actuator from moving on the actuator-carrier in the service position.

The actuator can thus be installed and removed in a direction that is radial relative to the axis of rotation of the wheel. There happens to be a large amount of empty space facing the actuators in this radial direction, thereby facilitating access to the actuator and making it easier to remove. This arrangement makes it possible in particular for the actuator to be removed without removing the brake and the wheel, which is impossible, e.g. for an actuator mounted directly facing the undercarriage and designed to be removed axially. Furthermore, most of the mechanical stresses that are generated by high levels of impacts or of vibration, or indeed that result as a reaction to the action of the pusher against the friction elements, are transmitted without stressing the means for holding the actuator in position on the actuator-carrier.

BRIEF DESCRIPTION OF THE DRAWINGS

The invention can be better understood in the light of the following description given with reference to the accompanying drawings, in which.

DETAILED DESCRIPTION OF THE INVENTION

Figure 1:
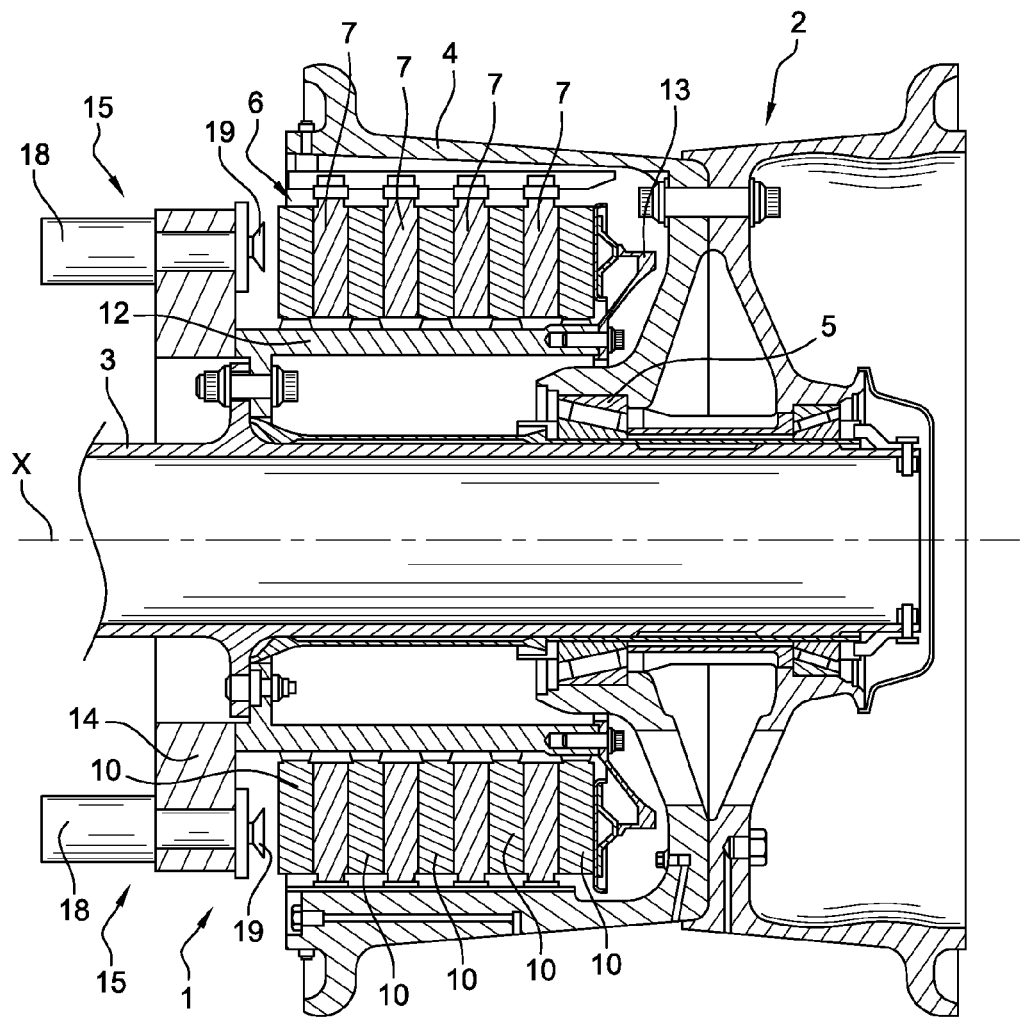
FIG. 1 is a section view of an aircraft wheel fitted with a brake of the invention.

The electric brake 1 of the invention that is shown in FIG. 1 is for braking a wheel 2 of an aircraft that is received on an axle 3 of axis X in order to rotate about an axis of rotation X. The wheel 2 has a rim 4 that carries a tire (not shown) and that is mounted to rotate on an axle 3 by means of bearings 5.

Below, the term "axial direction" is used to designate a direction parallel to the axis X, and the term "radial direction" to designate a direction perpendicular to the axial direction.

Inside the rim 4 there is a stack of disks 6 having a central axis that coincides with the axis X. The stack of disks 6 comprises alternating rotor disks 7 that are constrained to rotate with the rim 4, and stator disks 10 that are constrained to remain secured to a torsion tube 12 that is itself prevented from rotating.

The stack of disks 6 extends between a stationary end wall 13 fitted to the torsion tube 12, and an actuator-carrier 14 that is also fitted to the torsion tube (by fastener screws (not shown)). With reference to FIGS. 1 to 5, the actuator-carrier 14 carries electromechanical actuators 15, each actuator 15 in this example comprising a first body 16 containing an electric motor 17 and a second body 18 receiving a pusher 19 that faces the stack of disks 6 and that is movable axially under drive from the electric motor 17 in order to apply a braking force against the stack of disks 6 in controlled manner.

Figure 2:
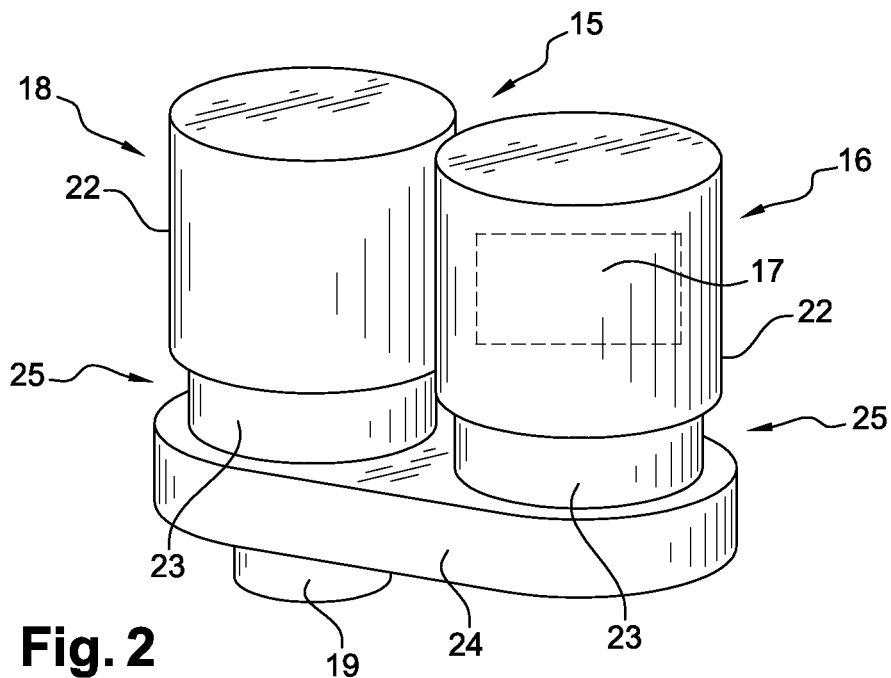
FIGS. 2 and 3 are diagrammatic perspective views of an actuator arranged to be mounted on an actuator-carrier of a brake of the invention in first and second embodiments.

In a first embodiment, shown in FIG. 2, the first body 16 and the second body 18 have respective main portions 22 that are generally cylindrical in shape and root portions 23 that are likewise generally cylindrical in shape and of diameter smaller than the diameter of the main portions. The first body 16 and the second body 18 are connected together via their root portions 23 by a projecting base 24 that contains step-down gearing. In each body, a groove 25 is thus defined between a face of the main portion and a facing face of the projecting base 24.

Figure 3:
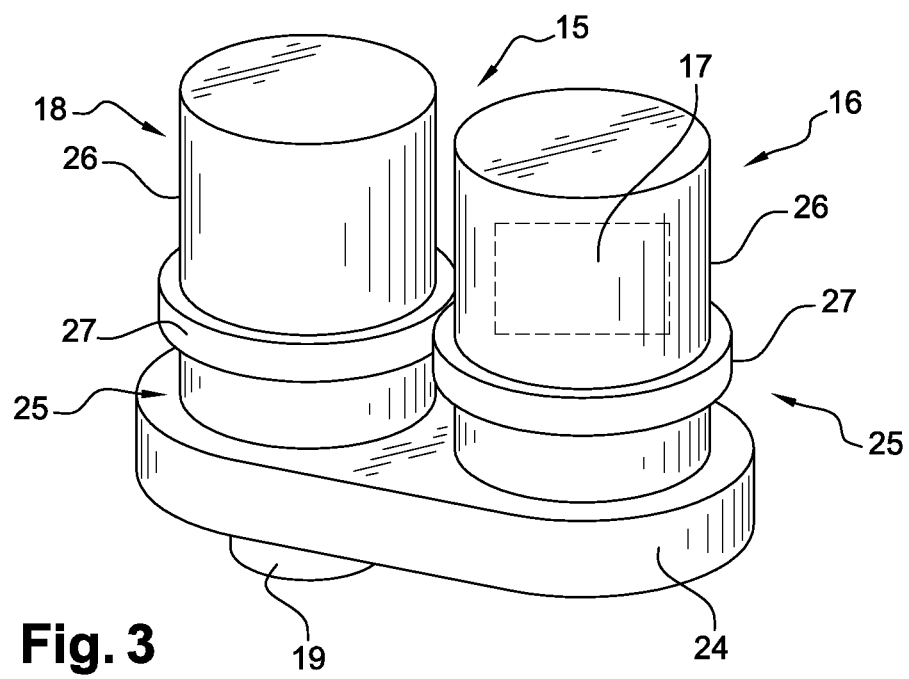
Figure 4:
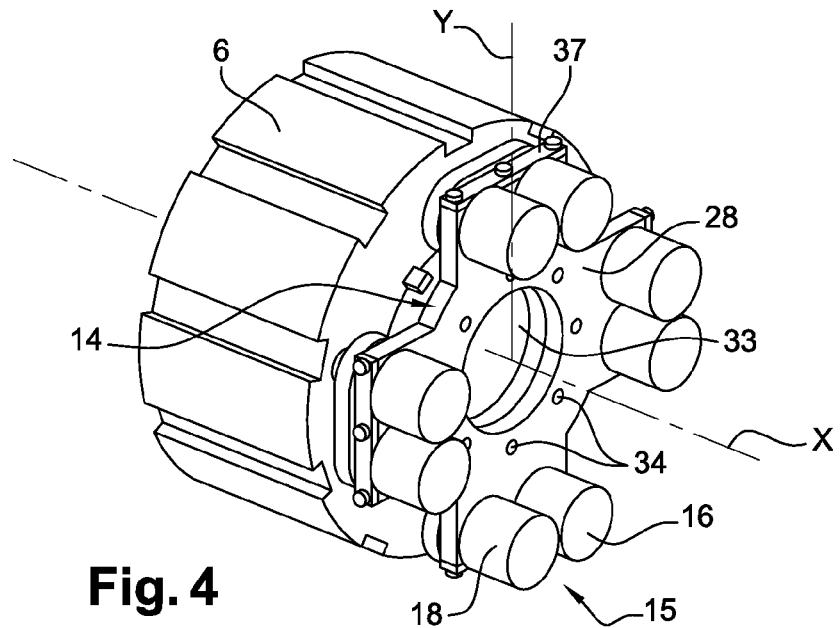
FIGS. 4 and 5 are diagrammatic perspective views showing how actuators are mounted on an actuator-carrier of a brake of the invention, with one actuator being shown removed in FIG. 5.
Figure 5:
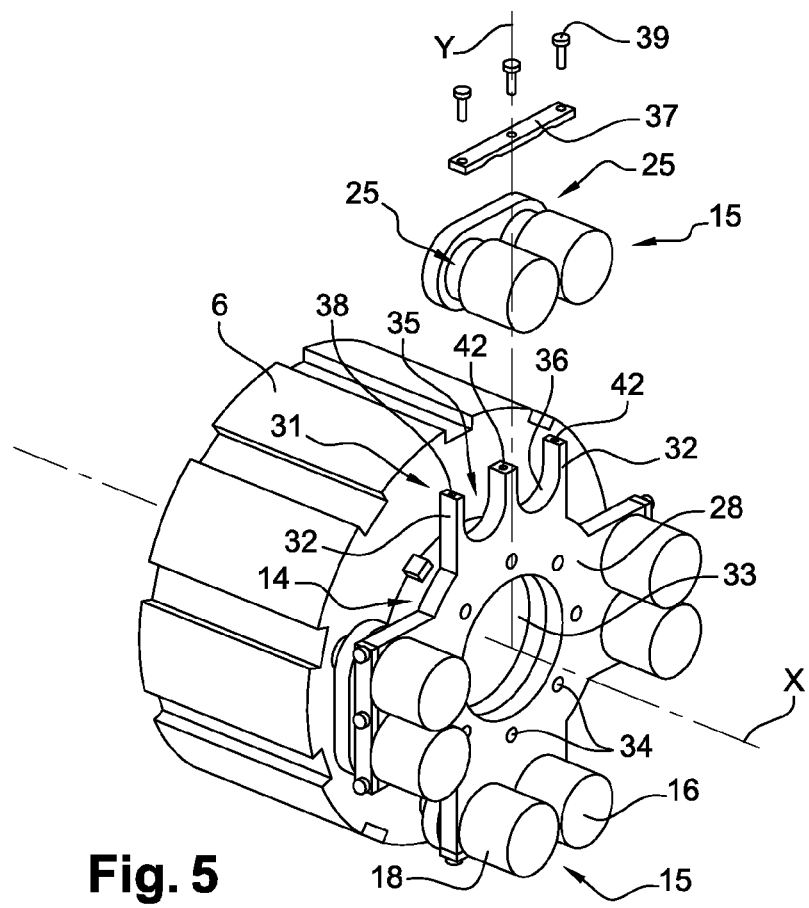

In a second embodiment, as shown in FIG. 3, the first body 16 and the second body 18 have respective cylindrical main portions 26, each having a ring 27 mounted around it. The first and second bodies are secured to each other via their root portions by a projecting base 24. In each body, a groove 25 is thus defined between a face of the ring 27 and a facing face of the projecting base 24. With reference to FIGS. 4 and 5, in which the stack of disks 6 is shown in simplified manner in order to clarify the drawings, the brake comprises an actuator-carrier 14 that has a support 28 defining four guide units 31, each comprising three parallel fingers 32 extending radially from the periphery of the support 28. The support 28 has a circular opening 33 for passing the axle, and orifices 34 for receiving screws that fasten the actuator-carrier 14 to the torsion tube 12. Each guide unit 31 is for receiving a respective actuator 15. The guide units 31 are regularly distributed around the periphery of the central plate 28 of the actuator-carrier 14. The space between adjacent fingers 32 constitutes a reception space 35 for receiving one of the bodies of an actuator 15. Each reception space includes a semicircular recess 36 formed in the central plate 28. These semicircular recesses 36 define a working position in which an actuator 15 is positioned when installed on the actuator-carrier 14.

While being installed on the actuator-carrier 14, the actuator 15 is guided in a radial direction Y between the fingers 32 of a guide unit 31 of the actuator-carrier 14. The fingers 32 penetrate into the grooves 25 of the bodies 16, 18 of the actuator 15 so as to guide the bodies of the actuator 15 towards the semicircular recesses 36, thereby guiding the actuator 15 towards its service position. The fingers 32 are shaped to provide guidance that prevents any axial movement of the actuator 15 while it is being installed, ignoring clearance for guidance.

A strap 37 is then fitted to the ends of the fingers 32 on bearing faces 38 of the fingers that are perpendicular to the radial installation direction, so as to close off the reception space 35 of the actuator and hold the actuator 15 in its service position. The strap 37 is then fastened to the bearing faces 38 of the fingers 32 by three fastener screws 39 that are screwed into three tapped orifices 42 in the fingers 32 and opening out in the bearing faces 38.

In order to remove the actuator, it suffices to unscrew the fastener screws 39, to remove the strap 37, and to make the actuator 15 slide radially towards the outside of the actuator-carrier 14.

A first advantage of the invention lies in the radial direction Y for installing and removing the actuator. On the landing gear of most airplanes, the actuators 15 have a large amount of empty space facing said actuators in the radial direction for installation and removal, thus making it possible to install and remove an actuator 15 without removing the wheel and the brake. Furthermore, the position of the fastener screws 39 for fastening the straps 37 makes them relatively easy for an operator on the ground to access since there is sufficient space to operate a screwdriver when installing or removing the screws.

A second advantage of the invention is the robust nature of the way the actuators 15 are installed. During landing and braking, the stresses that result from impacts, vibration, and the force exerted by the pusher on the disks do not give rise to shear stress on the fastener screws. In addition, these fastener screws 39 serve to fasten the strap 37 that serves to prevent any radial movement of the actuator 15. However, most of the forces exerted on the actuator 15 tend to impart axial movement thereto. In the electric brake of the invention, the actuator is held in the axial position mainly by the guide assemblies of the actuator-carrier 31, and thus by the structure of the brake, and not by the screws for fastening the strap. They are therefore subjected to forces that are relatively weak.

Figure 6:
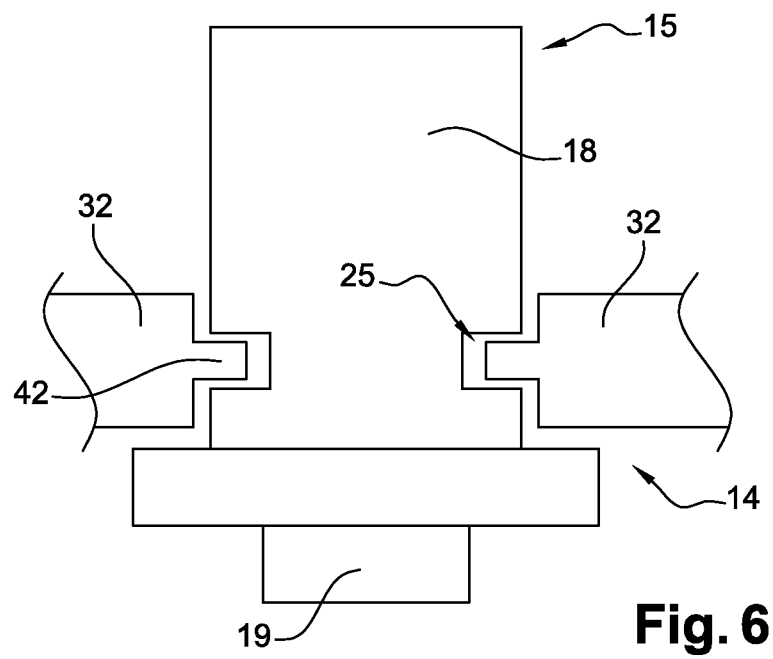
FIGS. 6 and 7 are diagrams showing means for guiding an actuator and an actuator-carrier of a brake of the invention in two other embodiments.
Figure 7:
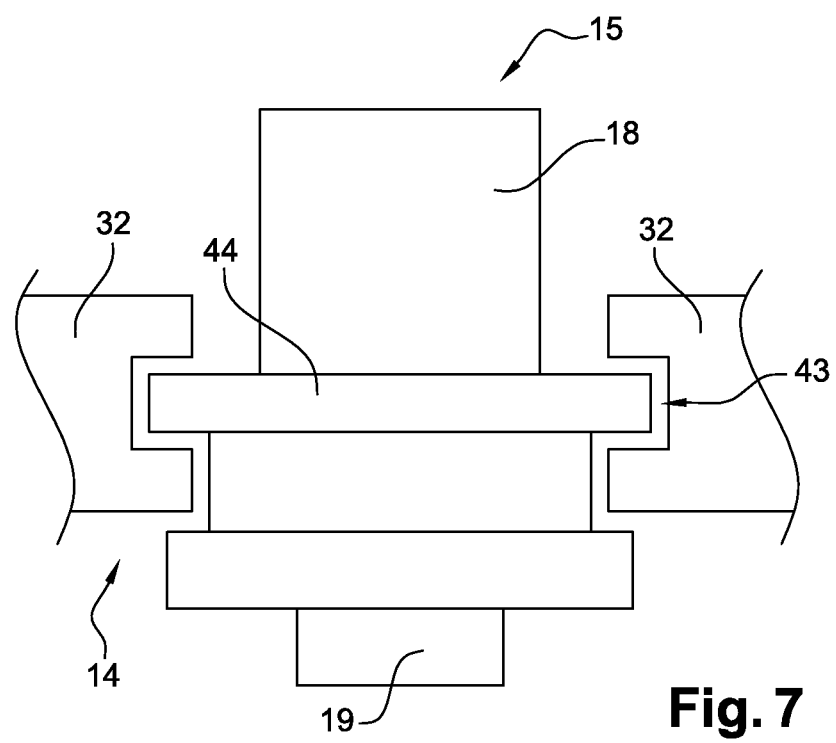

FIGS. 6 and 7, in which only the second body 18 of an actuator 15 is visible, show variant configurations for the guide means for guiding an actuator 15 in the actuator-carrier 14.

With reference to FIG. 6, the fingers 32 have respective splines 42 extending along the fingers 32 in the reception spaces. A spline 42 penetrates into the groove 25 of the second body 18 of the actuator 15 while the actuator 15 is being guided in the actuator-carrier 14.

With reference to FIG. 7, each finger 32 has a groove 43 that runs along the finger 32 within the reception spaces, and the second body 18 of the actuator 15 has a ring 44 surrounding the body, which ring penetrates into the grooves 43 of two fingers 32 while the actuator 15 is being guided.

The invention is not limited to the particular embodiment described above, but on the contrary covers any variant coming within the ambit of the invention as defined by the claims.

Although one particular electric brake architecture is used for describing the invention, and involves a certain number of electromechanical actuators, the invention is naturally applicable to any type of brake having an actuator-carrier and at least one electromechanical actuator.

Although a strap is used that is arranged to be fastened by means of screws extending radially in the actuator-carrier, it is possible for the strap to be mounted in some other way, providing it holds the actuator stationary in its service position and prevents any radial movement thereof.

Although a certain number of embodiments are described for the guide means that guide an actuator in the actuator-carrier, the invention applies to any type of guide means involving a groove and a projection.

The invention claimed is:

1. A brake for an aircraft wheel, the brake comprising:
an actuator-carrier (14);
at least one electromechanical actuator (15) carried by the actuator-carrier and having a pusher (19) that is movable along a direction parallel to an axis of rotation (X) of the wheel (2) and facing friction elements (7, 10) in order to apply a braking force selectively against the friction elements (7, 10),
the actuator-carrier (14) and the actuator (15) including guide means (25, 32) for guiding the actuator (15) while it is being installed on the actuator-carrier (14) in a radial direction (Y) until it reaches a service position, said guide means forming a bearing surface suitable for transmitting braking forces from the actuator to the actuator-carrier, and
position-holder means (37) for holding the position of the actuator in its service position,
wherein the position-holder means (37) comprises a strap (37) fastened to the actuator-carrier (14) in order to prevent the actuator (15) from moving on the actuator-carrier (14) in the service position, and
wherein the guide means includes a groove located on the actuator and the strap is at least partially seated within the groove.

2. A brake according to claim 1, wherein the strap (37) is removable radially and is fastened to the actuator-carrier (14) by fastener means (39) including at least one screw (39) that extends radially.

3. A brake according to claim 2, wherein the strap (37) comes to bear against a bearing face of the actuator-carrier (38) that is perpendicular to the radial direction (Y) for installing the actuator (15).

4. A brake according to claim 1, wherein the guide means (25, 32) form the groove (25) in the actuator (15) and form a projection (32, 42) on the actuator carrier suitable for penetrating in the groove (25) in order to provide radial guidance for the actuator (15) in the actuator-carrier (14).

5. A brake according to claim 4, wherein the groove (25) is defined on the actuator between a face of a ring (27) surrounding a body (16, 18) of the actuator (15) and a facing face of a base (24) projecting from the body (16, 18) of the actuator (15).

6. A brake according to claim 4, wherein the groove is defined on the actuator (15) by a ring (44) surrounding a body (16, 18) of the actuator (15).

7. A brake according to claim 1, wherein the guide means (25, 32) are shaped to provide positive guidance preventing any axial movement of the actuator (15) while it is being installed.

8. A brake according to claim 1, wherein the strap is a structure separate from the actuator (15) and is operative to secure the actuator to the actuator-carrier (14).

9. A brake according to claim 1, wherein the strap (37) closes off a reception space in the actuator carrier (14) for the actuator (15) and is operative to secure the actuator (15) to the actuator-carrier (14).

\* \* \* \* \*